United States Patent [19]
Enokido et al.

[11] 3,926,929
[45] Dec. 16, 1975

[54] PROCESS FOR POLYMERIZATION OF OLEFIN

[75] Inventors: Nobuo Enokido; Atsushi Murakami, both of Kawasaki; Kazuo Yamaguchi, Tokyo; Natsuki Kanoh, Yokohama; Toru Tanaka, Kawasaki; Shigeaki Okano, Yokohama; Masatoshi Suzuki, Tokyo, all of Japan

[73] Assignee: Mitsubishi Chemical Industries, Ltd., Tokyo, Japan

[22] Filed: Mar. 7, 1974

[21] Appl. No.: 448,885

Related U.S. Application Data

[63] Continuation-in-part of Ser. No. 244,939, April 17, 1972, abandoned.

[30] Foreign Application Priority Data

Apr. 16, 1971   Japan.............................. 46-24358
June 18, 1971   Japan.............................. 46-43786

[52] U.S. Cl..... 260/85.3 R; 252/429 C; 252/431 R; 260/88.2 R; 260/93.7; 260/94.3; 260/94.9 E
[51] Int. Cl.². C08F 4/14; C08F 10/00; C08F 10/02
[58] Field of Search ....... 260/85.3, 93.7, 88.2, 94.3, 260/94.9 E

[56]   References Cited
UNITED STATES PATENTS 3,210,334   10/1965   Canick ......................... 260/94.9 E
3,288,769   11/1966   Cooper et al. ................. 260/94.9 E
3,573,266   3/1971    Stevens ........................ 260/94.9 E
3,766,158   10/1973   Yamaguchi et al. ........... 260/94.9 E

FOREIGN PATENTS OR APPLICATIONS 2,012,697   3/1970    France
1,281,024   11/1961   France
860,407     2/1961    United Kingdom Primary Examiner—Edward J. Smith
Attorney, Agent, or Firm—Oblon, Fisher, Spivak, McClelland & Maier

[57]   ABSTRACT

Olefin polymerization is conducted using a catalyst system comprising an organo-aluminum compound and a solid catalyst product prepared by reacting an organo-tin compound of the formula $SnR_3Y$ wherein R is a hydrocarbon group having 1–14 carbon atoms and Y is a halogen or alkoxy, and a halide of a Group III element of the Periodic Table, with quadrivalent titanium compound, quadrivalent vanadium compound, pentavalent vanadium compound, or a mixture or reaction product thereof. In one embodiment, the reaction may be conducted in the presence of a titanium compound having a valency of lower than quadrivalent or a vanadium compound having a valency of lower than quadrivalent or pentavalent.

5 Claims, No Drawings

PROCESS FOR POLYMERIZATION OF OLEFIN

This application is a Continuation-In-Part of application Ser. No. 244,939, filed Apr. 17, 1972, now abandoned.

BACKGROUND OF THE INVENTION

1. Field Of The Invention:

This invention relates to a process for the polymerization of an olefin, and more particularly, to a process for the polymerization of an olefin using a novel catalytic composition.

2. Description Of Prior Art:

It has been known that catalytic compositions containing a transition metal compound of Groups IVa–VIa of the Periodic Table, and an organo-metallic compound of Groups I – III of the Periodic Table, are effective for polymerization of olefins at relatively low temperatures under relatively low pressures. However, the conventional catalytic compositions have not proven to be entirely industrially acceptable.

It would be desirable to provide a catalyst of very high catalytic activity. If the catalytic activity is very high, the resulting polymer can be used without removal of catalyst residue following polymerization.

It would also be desirable to provide a catalyst which would enable slurry polymerization at relatively low temperatures, e.g., about 100°C. or lower than 100°C., resulting in a high product bulk density. In general, the higher the bulk density, the greater will be the productivity of the process.

It would further be desirable to provide a catalyst which would enable a broad molecular weight distribution in slurry polymerization. Heretofore, in order to provide a broad molecular weight distribution by slurry polymerization, it was necessary to form two separate lots of polymer, pelletize each of the lots and comix the pellets. Unfortunately, the resulting molded articles obtained by the mixed pellets was inferior in appearance and hence in commercial value. The difficulty seems to be that it was difficult to uniformly mix the high molecular weight product with the lower molecular weight product by a conventional pelletizer.

This non-uniformity is especially apparent if the prior art product is cast into a film. In the film form, the non-uniformity manifests itself in the form of "fish eyes" in the film.

A need exists, therefore, for a high activity catalyst which can be used in slurry polymerization to yield a high bulk density product and which will result in a uniformly dispersed broad range molecular weight product.

SUMMARY OF THE INVENTION

Accordingly, it is one object of this invention to provide a process for polymerization of an olefin having a broad range of molecular weight distribution.

It is another object of this invention to provide a process for polymerization of an olefin using a catalyst system of high catalytic activity which need not be removed from the product following polymerization.

It is a further object of this invention to provide an olefin polymer having a high bulk density and a broad range of molecular weight distribution.

It is a basic object of this invention to provide a process for polymerization of olefins by use of a novel catalyst system to yield a highly advantageous olefin polymer.

These and other objects, as will hereinafter become more readily apparent, can be attained by the polymerization of an olefin using a catalyst system comprising: an organo-aluminum compound and a solid product prepared by reacting an organo-tin compound of the formula $SnR_3 Y$ wherein R is a hydrocarbon group having 1–14 carbon atoms and Y is a halogen or an alkoxy group, and a halide of an element of Group III of the Periodic Table, with a quadrivalent titanium compound, quadrivalent vanadium compound, pentavalent vanadium compound, or a mixture or reaction product thereof. Said reaction may be conducted in the presence of a titanium compound and vanadium compound having a lower valency than the quadrivalent or pentavalent.

DETAILED DESCRIPTION OF PREFERRED EMBODIMENTS

The quadrivalent titanium compound and/or quadri- or pentavalent vanadium compound may be used in the form of liquid, if it is liquid at normal temperatures, or it may be used in the form of a solution dissolved in a solvent, e.g., hydrocarbon, if it is liquid or solid at normal temperatures.

The catalyst may use either the titanium compound or the vanadium compound separately. However, higher catalytic activities can be obtained by using a mixture, or a reaction product, of both the titanium compound and the vanadium compound. In the preparation of such a mixture, or reaction product, both the titanium compound and the vanadium compound are simply mixed, or are heated to a temperature of about 50° – 150°C. after mixing. The reason that it is above specified that a "reaction product" can be used, is that upon mixing the titanium and vanadium compounds together, a slight exothermic reaction results, accompanied by a change in color. It is thus presumed that a ligand exchange reaction, or a condensation reaction, is occurring. In mixing the titanium compound and the vanadium compound, an inert solvent, e.g., an inert hydrocarbon solvent, may be used. The ratio of the vanadium compound to the titanium compound may be broadly from 0.01 to 100, and preferably from 0.1 to 10 V/ Ti atomic ratio.

The quadravalent titanium compound useable herein may be a titanium compound of the highest valency form of titanium, and having the formula:

$$Ti(OR)_n X_{4-n}$$

wherein R represents an alkyl group; X represents a halogen atom; and n represents an integer of 0 – 4, or may be titanyl dichloride, titanyl dibromide, or titanium acetylacetonate.

Exemplary of suitable titanium compounds having said formula include the titanium tetrahalides, such as titanium tetrachloride, titanium tetrabromide or titanium tetraiodide; the titanium alkolates, such as titanium tetramethylate, tetraethylate, tetrapropylate, tetrabutylate or tetrapentylate; or the titanium haloalkolates, such as triethoxy titanium chloride, diethoxy titanium dichloride or monoethoxy titanium trichloride.

Suitable quadri- or pentavalent vanadium compounds are those vanadium compounds of the highest valency form of vanadium and having the formula:

$$V(OR)_{4-n}X_n$$

or $$VO(OR)_{3-m}X_m$$

wherein R represents an alkyl group; X represents a halogen atom; and $n$ represents an integer of 0 – 4 and $m$ represents an integer of 0 – 3, or vanadium acetylacetonate.

Exemplary of suitable vanadium compounds having said formula, include the vanadium tetrahalides, such as vanadium tetrachloride and tetrabromide; the vanadium alkolates, such as vanadium tetramethylate, tetraethylate, tetrapropylate or tetrabutylate; vanadium haloalkolates, such as triethoxy vanadium chloride, diethoxy vanadium dichloride or monoethoxy vanadium trichloride; the trialkyl vanadates, such as trimethyl vanadate, triethyl vanadate, tripropyl vanadate, or tributyl vanadate; the vanadium oxyhalides, such as trichlorovanadyl; or the vanadium oxyhaloalkolates, such as monochlorodipropyl vanadyl or dichloroethyl vanadyl.

It is preferable to combine a titanium compound with a vanadium compound to yield a catalyst having the highest catalytic activity. Suitable combinations include combinations of titanium tetrahalide and vanadium tetrahalide; titanium tetrahalide and vanadium oxyhalide; or titanium tetrahalide and trialkyl vanadate.

In the process of this invention, the solid product is prepared by reacting a quadrivalent titanium compound or quadri- or pentavalent vanadium compound or a mixture or reaction product thereof (hereinafter referred to as "component ($a$)") with an organo-tin compound (hereinafter referred to as "component ($c$)") and a Group III metal halide (hereinafter referred to as "component ($d$)"), optionally in the presence of a solid titanium compound and/or vanadium compound of a titanium or vanadium of lower than the highest possible valency, (hereinafter referred to as "component ($b$)").

The organo-tin compound (component ($c$)) may be represented by the formula:

$$SnR_3Y$$

wherein R is a hydrocarbon group having 1–14 carbon atoms; Y represents a halogen atom or an alkoxy group having 1–14 carbon atoms. For instance, R in said formula may be an alkyl group, such as methyl, ethyl, propyl, butyl, octyl, decyl, or dodecyl; an aralkyl group, such as benzyl; aryl such as phenyl, toluyl, xylyl or naphthyl; or an alicyclic group, such as cyclohexyl.

Y may be a halogen, such as chlorine, bromine, and iodine; or an alkoxy group, such as methoxy, ethoxy, propoxy or butoxy.

Suitable organo-tin compounds include triethyl-tin chloride and tributyl-tin chloride.

The Group III metal halide (component (d)) may be a halide of boron or aluminum, such as aluminum trichloride ($AlCl_3$), aluminum tribromide ($AlBr_3$), aluminum triiodide ($AlI_3$) or boron trichloride ($BCl_3$). Especially preferred are aluminum trichloride or boron trichloride. The reaction of component ($a$) with component ($c$) and component ($d$) is usually conducted in an inert gas atmosphere at a temperature of about 0° – 150°C., while stirring, to effect uniform mixing. In order to effect uniform reaction, an inert solvent can be added. The reaction time will depend upon the reaction temperature. Where the reaction temperature is high, the reaction time can be shortened. The component ($c$) and component ($d$) can be added after admixing or separately in discretional order. The ratio of component ($d$) to component ($a$) is from 0.01 to 100, and preferably 0.1 to 10 Md/Ma, wherein Md represents an atom of a Group III metal (Al or B) in component ($d$) and Ma represents an atom of a transition metal (Ti and/or V) in component ($a$). The ratio of components ($c$) to ($d$) is from 0.01 to 100, preferably 0.1 to 10 atomic ratio Sn/Md. Where trialkyl tin chloride and boron chloride are used, the atomic ratio of Sn/B is preferably 1 to 10.

In the process of this invention, the reaction of component ($a$) with component ($c$) and component ($d$) can be conducted in the presence of the solid titanium compound and/or vanadium compound having a valency of lower than the highest atomic valency, or a reaction product thereof (component ($b$)). When the catalyst system is prepared in the presence of component ($b$), a broad and controlled molecular weight distribution for the olefin polymer can be easily obtained.

Suitable solid titanium compounds and/or vanadium compounds having valences of lower than the highest respective atomic valency (component ($b$)) can be easily prepared by reducing the quadrivalent titanium compound or quadri- or pentavalent vanadium compound or mixture or reaction product thereof, with a suitable reducing agent such as a Group I to Group III metal or with an organo-metallic compound of a Group I to Group III metal. Especially preferred is to use an organo-aluminum compound having the formula:

$$Al\ R_n\ X_{3-n} \qquad (1)$$

wherein R represents a hydrocarbon group of 1 – 14 carbon atoms; X represents a hydrogen atom, halogen atom or an alkoxy group; and $n$ represents an integer of 1 – 3.

Typical examples of R in the formula include alkyl groups, such as methyl, ethyl, propyl, butyl, octyl, decyl, and dodecyl groups; aralkyl groups, such as benzyl group; aryl groups, such as phenyl, toluyl, xylyl and naphthyl groups; or alicyclic groups, such as cyclohexyl group.

Typical examples of X include hydrogen or halogen, such as chlorine, bromine or iodine; or alkoxy, such as methoxy, ethoxy, propoxy or butoxy.

Suitable reducing agents which may be used to prepare the lower valency products are the trialkyl aluminums, such as triethyl aluminum or triisobutyl aluminum; the dialkylaluminum monohalides, such as diethylaluminum monochloride or dibutylaluminum monochloride; the alkylaluminum sesquihalides, such as ethylaluminum sesquihalide; the alkylaluminum hydrides, such as diethylaluminum monohydride; or the alkylaluminum alkoxides, such as diethylaluminum monoethoxide.

A mixture of an organo-tin compound and a Group III metal halide can be used as a suitable reducing agent different from said organo-aluminum compounds.

In the reducing reactions, the titanium compound and/or the vanadium compound in their highest valency states are admixed with said reducing agent, if necessary, together with a suitable hydrocarbon diluent, to effect uniform contact at normal temperatures or higher. If necessary, the resulting solid precipitate is separated, and it is then washed. In some cases, the solid precipitate can be used without separation.

The reaction conditions used for the reactions of component ($a$) with components ($c$) and ($d$) in the presence of component ($b$), are not critical. For instance, component ($b$), prepared previously, may be suspended in a hydrocarbon diluent and components ($a$), ($c$) and ($d$) may be added to the suspension in discretional order. The contents can be uniformly admixed at normal temperatures or higher. Alternatively, component (b) may be added to a mixture of components (a), (c) and (d).

In the preparation of the catalyst in the presence of a component (b), it is preferable to select as component (a), a titanium compound and/or the vanadium compound which is different from the titanium compound or the vanadium compound used for the preparation of component (b). If this cannot be done, it is preferable to select the reduction reaction conditions involving component (a), which is different from the reduction reaction conditions involving the preparation of component (b). That is to say, different reducing agents and/or different reaction temperatures should be used.

In some cases, the advantageous results of this invention can be obtained by the use of a single compound having a lower valency state, prepared by reducing a quadri- or pentavalent vanadium compound with components (c) and (d), and by using as the component (a), a mixture, or reaction product, of the titanium compound and the vanadium compound. Where the same reducing agent is used to reduce the component (a) and for preparing the component (b), an excess amount of this reducing agent can be used in the preparation of component (b) and then component (a) is added thereto to yield component (a) in reduced form.

The quantity of component (b) used is not critical and can be selected over a relatively broad range, depending upon the desired molecular weight distribution of the polymer product.

As will be clear from the following examples, the molecular weight distribution of the polymer product will be affected by the ratio of component (b) to component (a), which is usually in a range of 0.01 – 100 atomic ratio Mb/Ma wherein Mb and Ma represent the transition metal (Ti and/or V) in component (b) as defined above. Where the vanadium compound is used as component (b), and the mixture of the titanium compound and the vanadium compound is used as component (a), it is preferable that Mb/Ma be within the range of 0.01 – 100. When component (a) reacts with components (c) and (d), catalyst particles consisting of components (b) and (e) are obtained which may be easily separated from unreacted materials and inert solvent by conventional means, such as filtration, centrifugal separation or distillation under reduced pressure, etc. The separated solid product may further be washed with an inert solvent to remove substantially all of the unreacted raw materials. The organo-aluminum compound should then be used with the solid catalyst product in a ratio of 0.1 – 500, preferably 1 – 50 atomic ratio of Al/Ti + V (ratio of Al in the organo-aluminum compound to Ti + V in the solid product).

A wide variety of olefins may be polymerized using this catalyst system. For instance, this system can be used for the polymerization of ethylene, propylene, butene-1, etc. Most preferred is in the polymerization of ethylene, or a mixture of ethylene and a small amount (less than 50 mole % and preferably less than 30 mole % based on the ethylene) of another α-olefin or diolefin, such as propylene, butene-1 or butadiene.

During polymerization, the catalyst system is usually dispersed in an inert medium and the olefin or olefin mixture is supplied thereto. Suitable inert medium which may be used for this purpose include the aliphatic hydrocarbons, such as pentane, hexane, peptane, octane, isooctane; the alicyclic hydrocarbons, such as cyclopentane, cyclohexane; or the aromatic hydrocarbons, such as benzene or toluene. The particular medium selected, however, is not critical. The polymerization reaction is usually conducted at a temperature of from room temperature to 250°C., preferably 50° – 100°C., under atmospheric pressure to 100 atm.. If 20 – 500 mole% (to olefin), preferably 50 – 300 mole % (to olefin) of hydrogen is supplied to the polymerization reaction system, the molecular weight controlling effect by the hydrogen will be significant, so that the average molecular weight of the polymer can be easily controlled, even though the polymerization temperature is relatively low. Accordingly, polymers of particular predetermined molecular weights can be easily prepared.

The resulting polymer will have a quite high bulk density of greater than 0.3 g/cm³, and the particle size distribution will be quite sharp and narrow.

The catalyst of this invention has the following additional advantages:

1. its catalytic activity for olefin polymerization is quite high and there is little decrease in catalytic activity over extended periods of time;

2. its catalytic activity for copolymerization reactions involving ethylene and other α-olefins, such as propylene and butene, or diolefins, such as butadiene is also quite high.

Having generally described the invention, a further understanding can be obtained by reference to certain specific examples which are provided herein for purposes of illustration only and are not intended to be limiting in any manner unless otherwise specified.

In the examples, the molecular weight was measured by the viscosity average molecular weight measuring method, which is disclosed in L. H. Tung; Journal of Polymer Science Vol. 34, Page 333–348 (1957).

The value is calculated from the intrinsic viscosity and fractional polymer molecular weight by the following equation $$[\eta] = 5.1 \times 10^{-4} M^{0.725}$$

wherein $[\eta]$ is the intrinsic viscosity in tetralin at 130°C.

ii) $\dfrac{\overline{MW}}{\overline{MN}} \rightarrow \dfrac{\text{weight average MW (Molecular Weight)}}{\text{weight average MW (Molecular Weight)}}$ The value is calculated by the measurement of fractional polymer.

EXAMPLE 1

72 m mole of aluminum chloride was admixed with 90 m mole of tri-n-butyl tin chloride in an argon atomosphere and the mixture was maintained at 60°C for 1 hour, while stirring. The aluminum chloride was completely dissolved to obtain a uniform solution even after cooling to normal temperatures. Separately, 30 m mole of titanium tetrachloride was admixed with 30 m mole of tri-n-butyl vanadate in an argon atmosphere at normal temperatures in the presence of 100 ml of cyclohexane.

The mixed solution of aluminum chloride and tri-n-butyl tin chloride was added to the latter solution, and the mixture was stirred at 60°C. for 4 hours. The resulting purplish-black precipitate was washed with n-hexane after cooling to normal temperatures, to yield a solid product which is insoluble in n-hexane.

A portion of the solid product was dried, and analyzed. The atomic ratio of Ti : V : Al was about 1 : 3 : 2.

Into a 2 liter autoclave, after purging with nitrogen gas, 1 liter of n-hexane slurry containing 14 mg. of the solid product and 0.2 m mole of triisobutyl aluminum were supplied and the contents were heated at 90°C. 8 kg/cm² of hydrogen was supplied while stirring and then ethylene was supplied to obtain a total pressure of 13 kg/cm².

At the time of supplying the ethylene, an exothermic reaction and polymerization of ethylene was observed. The polymerization temperature was maintained at 90°C. and ethylene was additionally supplied so as to maintain the total pressure at 13 kg/cm² to yield a constant pressure polymerization for 60 minutes.

237 g. of white powdery polyethylene having an average molecular weight of 55,000 was obtained, which corresponded to a K value of 4,400, which is the yield of polyethylene per gram of catalyst (g) per hour (hr.) and pressure of ethylene (kg/cm²). The resulting polyethylene had a high bulk density of 0.36 g/cc and a density of 0.967.

(Reference 1)

A uniform solution was prepared in accordance with the process of Example 1, except that 33 m mole of aluminum chloride and 65 m mole of tri-n-butyl tin chloride were used. 100 ml. of n-hexane was added to the solution at normal temperatures and then 27 m mole of vanadium tetrachloride was added dropwise, while stirring, at 25°C. The resulting precipitate was completely washed with n-hexane in accordance with the process of Example 1, to yield a solid product.

The polymerization of ethylene was repeated in accordance with the process of Example 1, except that a solid product and triisobutyl aluminum were used and 2.5 kg/cm² of hydrogen gas was supplied. 73 g. of a white powdery polyethylene having an average molecular weight of 65,000 was obtained. However, the K value was only 550.

(Reference 2)

A solid product was prepared in accordance with the process of Reference 1 except that the vanadium tetrachloride was replaced with titanium tetrachloride and the reaction was conducted at 60°C. for 3 hours.

The polymerization of ethylene was repeated in accordance with the process of Example 1, except that a solid product and triisobutyl aluminum were used. 20 g. of white powdery polyethylene having an average molecular weight of 71,000 was obtained, however, and the K value was only 360.

(Reference 3)

The polymerization of ethylene was repeated in accordance with the process of Example 1, except using the mixture of 3 : 1 of the solid composition of Reference 1 to that of Reference 2 together with triisobutyl aluminum. The K value was only 480.

(Reference 4)

The process of Example 1 was repeated, except that aluminum chloride was not used and only 114 m mole of tri-n-butyl tin chloride was used. The resulting product was a uniform solution, and no solid material was produced. Thus, a useable catalyst was not prepared.

EXAMPLE 2

A solid product was prepared in accordance with the process of Example 1, except that the amounts of aluminum chloride and tri-n-butyl tin chloride were varied.

Polymerization of ethylene was repeated in accordance with the process of Example 1, using said solid product and triisobutyl aluminum as the catalyst.

The results are shown in Table I.

TABLE I

| AlCl₃ m mole | (nBu)₃ SnCl m mole | Al/Ti + V | Al/Sn | K value | average molecular weight of polymer (× 10⁴) | bulk density of polymer (g/cc) |
|---|---|---|---|---|---|---|
| 40 | 135 | 0.68 | 0.3 | 3000 | 5.4 | 0.30 |
| 72 | 90 | 1.2 | 0.8 | 4400 | 5.5 | 0.36 |
| 72 | 240 | 1.2 | 0.3 | 5400 | 5.2 | 0.34 |
| 192 | 240 | 3.2 | 0.8 | 2400 | 5.4 | 0.38 |

In the Table, nBu represents n-butyl group.

EXAMPLE 3 AND REFERENCE 5

A solid composition was prepared in accordance with the process of Example 1, except that tri-n-butyl tin chloride was replaced with di-n-butyl tin dichloride as a reference or triisobutyl tin chloride. Polymerization of ethylene was repeated in accordance with the process of Example 1, except using solid composition and triisobutyl aluminum combination.

TABLE II

| | Organo-tin compound | K value | Average molecular weight of polymer (× 10⁴) | bulk density of polymer (g/cc) |
|---|---|---|---|---|
| Reference 5 | (nBu)₂SnCl₂ | 1050 | 5.7 | 0.29 |
| Invention | (nBu)₃SnCl | 4400 | 5.5 | 0.36 |
| Invention | (iBu)₃SnCl | 3900 | 5.3 | 0.35 |

In the Table, i-Bu represents isobutyl group.

EXAMPLE 4

A solid composition was prepared in accordance with the process of Example 1, except that a reaction product of titanium tetrachloride and tri-n-butyl vanadate was used with a mixture of aluminum chloride and tri-n-butyl tin chloride at a temperature as shown in Table III.

The polymerization of ethylene was repeated in accordance with the process of Example 1, except using said solid product and triisobutyl aluminum. The results are shown in Table III.

TABLE III

| Temperature (°C.) | K value | average molecular weight of polymer (× 10⁴) | bulk density of polymer (g/cc) |
|---|---|---|---|
| 40 | 2800 | 5.3 | 0.34 |
| 60 | 4400 | 5.5 | 0.36 |

TABLE III-continued

| Temperature (°C.) | K value | average molecular weight of polymer (× 10⁴) | bulk density of polymer (g/cc) |
|---|---|---|---|
| 80 | 8900 | 5.4 | 0.32 |
| 100 | 14600 | 5.6 | 0.34 |

EXAMPLE 5

A solid composition was prepared in accordance with the process of Example 1, except that the amounts of titanium compound and vanadium compound and the type of vanadium compound were changed as shown in Table IV. The polymerization of ethylene was repeated in accordance with the process of Example 1, except using said solid product and triisobutyl aluminum.

The results are shown in Table IV.

TABLE IV

| Titanium Compound | | Vanadium Compound | V/Ti | K value | average molecular weight of polymer | bulk density of polymer |
|---|---|---|---|---|---|---|
| type | amount (m mole) | type | amount (m mole) | | (× 10⁴) | (g/cc) |
| TiCl₄ | 40 | VO(O-nBu)₃ | 20 | 0.5 | 2600 | 6.0 | 0.30 |
| " | 30 | " | 30 | 1.0 | 4400 | 5.5 | 0.36 |
| " | 20 | " | 40 | 2.0 | 4500 | 5.0 | 0.33 |
| " | 30 | VOCl₃ | 30 | 1.0 | 2800 | 5.2 | 0.37 |

EXAMPLE 6

The polymerization of ethylene was repeated in accordance with the process of Example 1, except using the organo-aluminum compound shown in Table V as the catalyst.

The results are shown in Table V.

TABLE V

| Organo-aluminum compound | K value | average molecular weight of polymer (× 10⁴) | bulk density of polymer (g/cc) |
|---|---|---|---|
| Et₃Al | 4300 | 5.0 | 0.34 |
| (iBu)₃Al | 4400 | 5.5 | 0.36 |
| Et₂AlCl | 2200 | 7.3 | 0.45 |
| Et₂AlOEt | 1000 | 4.0 | 0.35 |

In the Table, Et represents ethyl group.

EXAMPLE 7

Into a 2 liter autoclave, the same catalyst and the same medium of Example 1 were supplied and the contents were heated to 80°C. A mixture of hydrogen and ethylene and propylene was supplied so that the total pressure was 7 kg/cm² while stirring. Ethylene was additionally supplied to maintain the pressure at 13 kg/cm² to effect constant pressure polymerization at 80°C for 60 minutes. 430 g of white powdery polyethylene was obtained. The mixture contained 64 mole % ethylene, 3 mole % propylene and 33 mole % hydrogen. The resulting polymer was pressed into the form of a sheet. According to the infrared spectrum analysis of the sheet, it was found that the copolymer of ethylene and propylene had an average molecular weight of 95,000 and a branching coefficient of 3 pendant CH₃ group/1000 C.

REFERENCE 6

Argon gas containing boron trichloride was introduced into 0.2 mole of tri-n-butyl tin chloride solution to prepare a dark brown solution of tri-n-butyl tin chloride containing 0.18 mole of boron trichloride.

The resulting solution of tri-n-butyl tin chloride and boron trichloride was heated to 100°C and 0.1 mole of vanadium tetrachloride was added. This temperature was maintained for 1 hour and then the mixture was cooled and washed with n-hexane to yield a purple solid product which was insoluble in n-hexane. The yield was 84% based on vanadium.

Substantially, no boron or tin was found in the solid product.

Into a 2 liter autoclave, 1 liter of n-hexane containing 30 mg of said solid composition and 0.45 m mole of triisobutyl aluminum were supplied after purging with nitrogen gas. The contents were heated to 90°C and 2 kg/cm² of hydrogen was supplied while stirring, and then ethylene was supplied to obtain a total pressure of 12 kg/cm².

Upon introduction of ethylene, an exothermic reaction was observed and the polymerization reaction was initiated. Constant pressure and constant temperature polymerization was conducted for 90 minutes by continuously supplying ethylene to maintain the total pressure at 12 kg/cm². 395 g of white powdery polyethylene having a viscosity average molecular weight of 49,000 and a bulk density of 0.45 g/cm³ was obtained. The K value was 1100.

REFERENCE 7

The preparation of the catalyst and the polymerization of ethylene were repeated in accordance with the process of Reference 6, except using tri-n-butyl tin chloride and boron trichloride solution at 25°C to effect reduction. The polymerization activity (K value) and the viscosity average molecular weight and the bulk density of resulting polymer were measured. The results are shown in Table VI.

REFERENCE 8

The preparation of the catalyst and the polymerization of ethylene were repeated in accordance with the process of Reference 6 except using titanium tetrachloride. The polymerization activity (K value) and the viscosity average molecular weight and the bulk density of resulting polymer were measured.

The results are shown in Table VI.

EXAMPLE 8

The preparation of the catalyst and the polymerization of ethylene were repeated in accordance with the process of Reference 6 except using 0.05 mole of titanium tetrachloride mixed with 0.05 mole of n-butyl vanadate, at normal temperature. The polymerization activity (K value) and the viscosity average molecular weight and the bulk density of resulting polymer were measured.

The results are shown in Table VI.

EXAMPLE 9

The preparation of the catalyst and the polymerization of ethylene were repeated in accordance with the process of Example 8. except using a partial pressure of 5 kg/cm² for each of the hydrogen and the ethylene. The polymerization activity (K value) and the viscosity average molecular weight and the bulk density of the resulting polymer were measured.

The results are shown in Table VI.

TABLE VI

| Example No. | Polymerization activity (K) (gEP/g-cat.hr. g/cm²) | Viscosity average molecular weight of polymer (× 10⁴) | bulk density of polymer (g/cm³) |
| --- | --- | --- | --- |
| Reference 7 | 1,150 | 4.5 | 0.40 |
| Reference 8 | 380 | 55 | 0.23 |
| Example 8 | 3,400 | 28 | 0.31 |
| Example 9 | 2,800 | 9.6 | 0.30 |

EXAMPLE 10

1. Preparation of Catalyst:

Into a 500 ml autoclave purged with nitrogen gas, 100 m mole of tributyl-tin-chloride and 80 m mole of aluminum chloride were supplied, and the mixture was stirred at 60°C for 1 hour. The contents were diluted with 50 ml of industrially pure cyclohexane to prepare the clear solution. The temperature of the content was maintained at 60°C and 64 m mole of vanadium tetrachloride was added dropwise thereto, while stirring. After the addition, the contents were aged at 80°C. for 2 hours, and washed with pure n-hexane to remove the soluble components. The resulting solid component was dried to obtain a purple powder (component ($b$)).

Into another 500 ml. autoclave purged with nitrogen gas, 100 m mole of tributyl-tin chloride and 80 m mole of aluminum chloride were supplied, and the mixture was stirred at 60°C. for 1 hour. The contents were diluted with 50 ml. of industrially pure cyclohexane and then 10 g. of purple powder was added to the contents at 25°C., while stirring. A mixture solution of 15 m mole of titanium tetrachloride and 15 m mole of vanadium tetrachloride was added dropwise to the mixture and the resulting mixed solution was aged at room temperature, while stirring. The content was washed with industrially pure n-hexane to remove soluble components and the resulting solid component was dried to obtain a solid catalyst powder.

2. Polymerization Reaction:

Into a 2 liter autoclave, 1 liter of pure n-hexane, 0.15 m mole of triisobutyl aluminum and 10 mg. of the solid catalyst powder prepared in step (1) were supplied. The contents were heated to 80°C. while stirring, and ethylene was polymerized for 1 hour under 6 kg/cm² of hydrogen pressure and 10 kg/cm² of ethylene pressure. 210 g. of polyethylene having a viscosity average molecular weight of 109,000 and 7.4 of ($\overline{MW}/MN$) (weight average molecular weight ($\overline{MW}$)/number average molecular weight ($\overline{MN}$) was obtained.

EXAMPLE 11

The catalyst was prepared in accordance with Example 10, except using 15 m mole of titanium tetrachloride and 15 m mole of vanadium tetrachloride per 5 m mole, respectively. The polymerization reaction of ethylene was repeated in accordance with the process of Example 10, except using the resulting catalyst.

The results are shown in Table VII.

EXAMPLE 12

The catalyst was prepared in accordance with Example 10, except using 1.67 m mole of titanium tetrachloride and 1.67 m mole vanadium tetrachloride. The ethylene polymerization reaction was repeated in accordance with the process of Example 10, except using the resulting catalyst.

The results are shown in Table VII.

EXAMPLE 13

The catalyst was prepared in accordance with Example 10, except using 64 m mole of dichloro monobutyl vanadate, in the preparation of component ($b$) and using 15 m mole of vanadium tetrachloride to the mixture of 10 m mole of titanium tetrachloride and 10 m mole of tributyl vanadate.

The ethylene polymerization was repeated in accordance with the process of Example 10 using the resulting catalyst.

The results are shown in Table VII.

EXAMPLE 14

The catalyst was prepared in accordance with Example 13, except using 3.3 m mole of titanium tetrachloride and 3.3 m mole of tributyl vanadate.

The ethylene polymerization was repeated in accordance with the process of Example 10, except using the resulting catalyst. The results are shown in Table VII.

TABLE VII

| No. | amount of catalyst (mg.) | partial pressure of hydrogen (PH₂) kg/cm² | partial pressure of ethylene (PEM) | time of polymerization (hr.) | Polymerization activity g-polyethylene / g-cat. PEM.HR. | $\overline{MV}$ (× 10⁴) | $\overline{MW}/MN$ |
| --- | --- | --- | --- | --- | --- | --- | --- |
| Example 10 | 10 | 6 | 10 | 1 | 2100 | 10.9 | 7.4 |
| Example 11 | 10 | 5 | 10 | 1 | 1400 | 8.7 | 12.0 |
| Example 12 | 10 | 2.5 | 10 | 1 | 1200 | 10.0 | 16.5 |
| Example 13 | 10 | 6 | 10 | 1 | 2000 | 10.9 | 6.8 |
| Example 14 | 10 | 3.5 | 10 | 1 | 1700 | 11.2 | 11.0 |

It should be clear from Table VII that polymers having wide and controlled distribution of molecular weight are obtainable by appropriate selection of the conditions of catalyst preparation and polymerization.

Reference 9

1. Preparation of Catalyst:

Into a 500 ml. autoclave purged with nitrogen gas, 100 m mole of tributyl-tin chloride and 80 m mole of aluminum chloride were supplied, and the mixture was stirred at 60°C. for 1 hour. The contents were diluted with 50 ml. of industrially pure cyclohexane to prepare a clear solution. The temperature of the contents was maintained at 60°C. and 64 m mole of dichloromonobutyl vanadate was added dropwise to said contents, while stirring. After the addition, the contents were aged at 80°C. for 2 hours, and then washed with industrially pure n-hexane to remove soluble components. The resulting solid component was dried to obtain a purple powder. This was equal to the solid product of the first catalyst component.

2. Polymerization Reaction:

Into a 2 liter autoclave, 1 liter of industrially pure n-hexane, 0.15 m mole of triisobutyl aluminum and 10 mg. of the solid catalyst powder prepared in step (1) were supplied. The contents were heated to 80°C. while stirring, and 4 kg/cm² of hydrogen gas was supplied. Ethylene was polymerized for 1 hour at an ethylene pressure of 10 kg/cm² to obtain 103 g. of slurry polyethylene having a viscosity average molecular weight of 63,000 and 8.2 of ($\overline{MW}/\overline{MN}$) (weight average molecular weight ($\overline{MW}$) / number average molecular weight ($\overline{MN}$).

The results are shown in Table VIII.

EXAMPLE 16

1. Preparation of Catalyst:

A solid catalyst product having a ratio V/Ti of about 5 (molar ratio), was prepared in accordance with process (1) in Example 15 except reducing and aging at 60°C.

2. Polymerization Reaction:

The polymerization reaction was repeated in accordance with the process of (2) in Reference 9 except using a hydrogen pressure of 20 kg/cm².

The results are shown in Table VIII.

EXAMPLE 17

1. Preparation of Catalyst:

A solid catalyst product having a ratio of V/Ti of about 3 (molar ratio) was prepared in accordance with the process (1) in Reference 9 except using a mixture of 30 m mole of titanium tetrachloride and 30 m mole of tributyl vanadate.

2. Polymerization Reaction:

The polymerization reaction was repeated in accordance with process (2) in Reference 9 except using a hydrogen pressure of 18 kg/cm², and 5 mg. of catalyst.

The results are shown in Table VIII. When using all of the above catalysts, the following conditions should be observed: The ratio of partial pressure of hydrogen to ethylene ($P_{H2}/P_{EM}$) should be varied in order to obtain polymers having almost the same viscosity average molecular weight under the same conditions of polymerization. In turn, the viscosity average molecular weight of the polymer will vary significantly if polymerization is conducted using the same ratio of $P_{H2}/P_{EM}$.

TABLE VIII

| Example No. | amount of catalyst (mg.) | partial pressure of hydrogen (PH₂) kg/cm² | partial pressure of ethylene (PEM) | time of polymerization (hr.) | Polymerization activity g-polyethylene g-cat.PEM.HR. | $\overline{MV}$ (× 10⁴) | $\overline{MW}/\overline{MN}$ |
|---|---|---|---|---|---|---|---|
| References |  |  |  |  |  |  |  |
| 9 | 10 | 4 | 10 | 1 | 1030 | 6.3 | 8.2 |
| 10 | 10 | 2 | 10 | 1 | 600 | 6.2 | 8.5 |
| Example |  |  |  |  |  |  |  |
| 15 | 10 | 8 | 10 | 1 | 1550 | 6.2 | 4.5 |
| 16 | 10 | 20 | 10 | 1 | 3700 | 5.6 | 4.8 |
| 17 | 5 | 18 | 10 | 1 | 4100 | 5.5 | 4.0 |

REFERENCE 10

1. Preparation of Catalyst:

The catalyst was prepared in accordance with the process of (1) in Reference 9 except using vanadium tetrachloride.

2. Polymerization reaction:

The polymerization reaction was repeated in accordance with the process of (2) in Reference 9, except using a hydrogen pressure of 2 kg/cm².

The results are shown in Table VIII.

EXAMPLE 15

1. Preparation of Catalyst:

The catalyst was prepared in accordance with the process of (1) in Reference 9, except using a mixture of 30 m mole of vanadium tetrachloride, and reducing and aging at 25°C. The resulting solid involved in the ratio of V/Ti≈ 10 (molar ratio).

2. Polymerization Reaction:

The polymerization reaction was repeated in accordance with process (2) in Reference 9 except using a hydrogen pressure of 8 kg/cm².

The results are shown in Table VIII.

EXAMPLE 18

Into a 10 l. autoclave was charged 6 l. of n-hexane and 100 mg. of catalyst prepared in Example 14 and 1.5 m mole of triisobutyl aluminum. The contents were heated to 80°C. while stirring, and hydrogen gas was supplied to 4.5 kg/cm². Ethylene was then polymerized for 2 hours under an ethylene pressure of 10 kg/cm² to obtain 3200 g. of polyethylene having a viscosity average molecular weight of 95,000.

The resulting polymer was admixed with an antioxidant and pelletized, and an inflation film was formed. The film was characterized by a smooth surface and uniform thickness and the appearance of the film was good.

Reference 11

The polymerization reaction was repeated in accordance with the process of Example 18 except using a mixture of 90 mg. of the catalyst as prepared in Example Reference 9 and 10 mg. of the catalyst as prepared in Example 17 and using a hydrogen partial pressure of 4 kg/cm² to obtain 2520 g. of polyethylene having a viscosity average molecular weight of 93,000. About 70 parts of the polymer had a viscosity average molecular weight of 63,000, and about 30 parts of the polymer had a viscosity average molecular weight of 250,000.

Where the resulting polymer was admixed with an antioxidant and was pelletized under the same conditions as Example 18, and then an inflation film was formed, it was observed that the film was characterized by microscopic roughness over its surface and by fine, opaque particles innumerably dispersed over the surface. The particles were found to be ethylene polymer particles when examined by infrared-ray microscope.

It is apparent from the results of Examples 18 and Reference 11 that when the polymer was formed into a film, fish eyes were not formed.

The superiority of using an organo tin of the form $SnR_3Y$ as compared with $SnR_4$ is shown in the following Reference 12.

REFERENCE 12

The process of Example 1 was followed except using tetra-n-butyl tin.

72 m mole of aluminum chloride was admixed with 90 m mole of tetra-n-butyl tin in an argon atmosphere and the mixture was maintained at 60°C for 1 hour, while stirring. Since the reaction is not enough, it was continued for 30 hours. The aluminum chloride was completely dissolved to obtain a uniform solution even after cooling to normal temperatures. Separately, 30 m mole of titanium tetrachloride was admixed with 30 m mole of tri-n-butyl vanadate in an argon atmosphere at normal temperature, in the presence of 100 ml of cyclohexane.

The mixed solution of aluminum chloride and tetra-n-butyl tin was added to the latter solution, and the mixture was stirred at 60°C for 4 hours. The resulting reddish purple precipitate was washed with n-hexane after cooling to normal temperatures, to yield a solid product which is insoluble in n-hexane.

A portion of the solid product was dried, and analyzed. The atomic ratio of Ti : V : Al was about 1 : 29 : 13.

Into a 2 liter autoclave, after purging with nitrogen gas, 1 liter of n-hexane slurry containing 14 mg of the solid product and 0.2 m mole of triisobutyl aluminum were supplied and the contents were heated at 90°C 8 kg/cm² of hydrogen was supplied while stirring and then ethylene was supplied to obtain a total pressure of 13 kg/cm².

At the time of supplying the ethylene, an exothermic reaction and polymerization of ethylene was observed. The polymerization temperature was maintained at 90°C and ethylene was additionally supplied so as to maintain the total pressure at 13 kg/cm² to yield a constant pressure polymerization for 60 minutes.

The results are shown in Table IX.

TABLE IX

| | Reference 12 |
|---|---|
| Product | 21 g of white powdery polyethylene |
| Molecular weight | 2,800 |
| Bulk density (g/cc) | 0.42 |
| K value | 350 |

K value = the yield of polyethylene per gram of catalyst (g) per hour (hr.) and pressure of ethylene (kg/cm²)

Having now fully described the invention, it will be apparent to one of ordinary skill in the art that many changes and modifications can be made thereto without departing from the spirit or scope of the invention as set forth herein.

Accordingly, what is claimed as new and intended to be covered by letters patent is:

1. A process for the polymerization of an olefin which comprises reacting said olefin in contact with a catalyst system comprising (a) an organo-aluminum compound of the formula
$$AlR_nX_{3-n}$$
wherein R represents a hydrocarbon group of 1–14 carbon atoms; X represents a hydrogen atom, halogen atom or an alkoxy group; and n represents an integer of 1–3; and (b) a solid catalyst reaction product of an organo-tin compound of the formula
$$SnR_3Y$$
wherein R represents a hydrocarbon group of 1–14 carbon atoms; Y represents a halogen atom or an alkoxy group having 1–14 carbon atoms, and a Group III metal halide selected from the group consisting of aluminum trihalide and boron trihalide with a mixture or reaction product of a titanium compound having the formula
$$Ti(OR)_nX_{4-n}$$
wherein R represents an alkyl group; X represents halogen atom; and n represents an integer of 0–4 titanyl dichloride, titanyl dibromide or titanium acetylacetonate and a vanadium compound having the formula
$$V(OR)_{4-n}X_n, VO(OR)_{3-m}X_m$$
wherein R represents an alkyl group; X represents a halogen atom and n represents an integer of 0–4 and m represents an integer of 0–3 or vanadium acetylacetonate wherein said reaction product (b) is formed at a temperature of 0°–150°C wherein the atomic ratio of the organo-tin compound to the Group III metal halide is 0.01 – 100, and the atomic ratio of the Group III metal halide to the titanium compound and the vanadium compound is 0.1 – 10.

2. The process of claim 1, wherein the olefin is selected from the group consisting of ethylene, propylene, butene-1, butadiene and mixtures thereof.

3. The process of claim 1, wherein the catalyst system is dispersed in an inert medium and polymerization is conducted at a temperature of from normal temperature to 250°C, under a pressure of atmospheric pressure to 100 atm.

4. The process of claim 1, wherein 20 – 500 molar percent of hydrogen based on the moles of olefin is supplied to the polymerization reaction system to control molecular weight distribution.

5. The process of claim 1, wherein said solid catalyst reaction product is formed in the presence of a solid compound prepared by reducing a vanadium compound having the formula $VO(OR)_{3-m}X_m$, wherein R reppresents an alkyl group, X represents a halogen atom and m represents an integer of 0 – 3 and a titanium compound having the formula $Ti(OR)_nX_{4-n}$, wherein R represents alkyl, X represents halogen and n represents an integer of 0 – 4 with an organo-tin compound of the formula $SnR_3Y$, wherein R represents a hydrocarbon group of 1 – 14 carbon atoms, Y represents halogen or an alkoxy group of 1 – 14 carbon atoms and a Group III metal halide selected from the group consisting of aluminum trihalide and boron trihalide.

* * * * *